No. 646,687. Patented Apr. 3, 1900.
J. W. GAYNER.
PUNCH BAR DEVICE FOR GAS PRODUCERS.
(Application filed Jan. 23, 1900.)

(No Model.)

Witnesses
Inventor
John William Gayner

Attorneys

UNITED STATES PATENT OFFICE.

JOHN WILLIAM GAYNER, OF SALEM, NEW JERSEY.

PUNCH-BAR DEVICE FOR GAS-PRODUCERS.

SPECIFICATION forming part of Letters Patent No. 646,687, dated April 3, 1900.

Original application filed January 15, 1898, Serial No. 666,806. Divided and this application filed January 23, 1900. Serial No. 2,420. (No model.)

*To all whom it may concern:*

Be it known that I, JOHN WILLIAM GAYNER, a citizen of the United States, residing in the city and county of Salem, State of New Jersey, have invented a new and useful Improvement in Poke or Punch Bars for Fire-Chambers, which improvement is fully set forth in the following specification and accompanying drawings.

My invention consists of novel means for forming a seal around a punch or poke bar of a fire-chamber—for instance, the fire-chamber of a gas-producer, where said bar passes through an opening in the wall of the chamber, so that the escape of gas through said opening is prevented.

Figure 1:
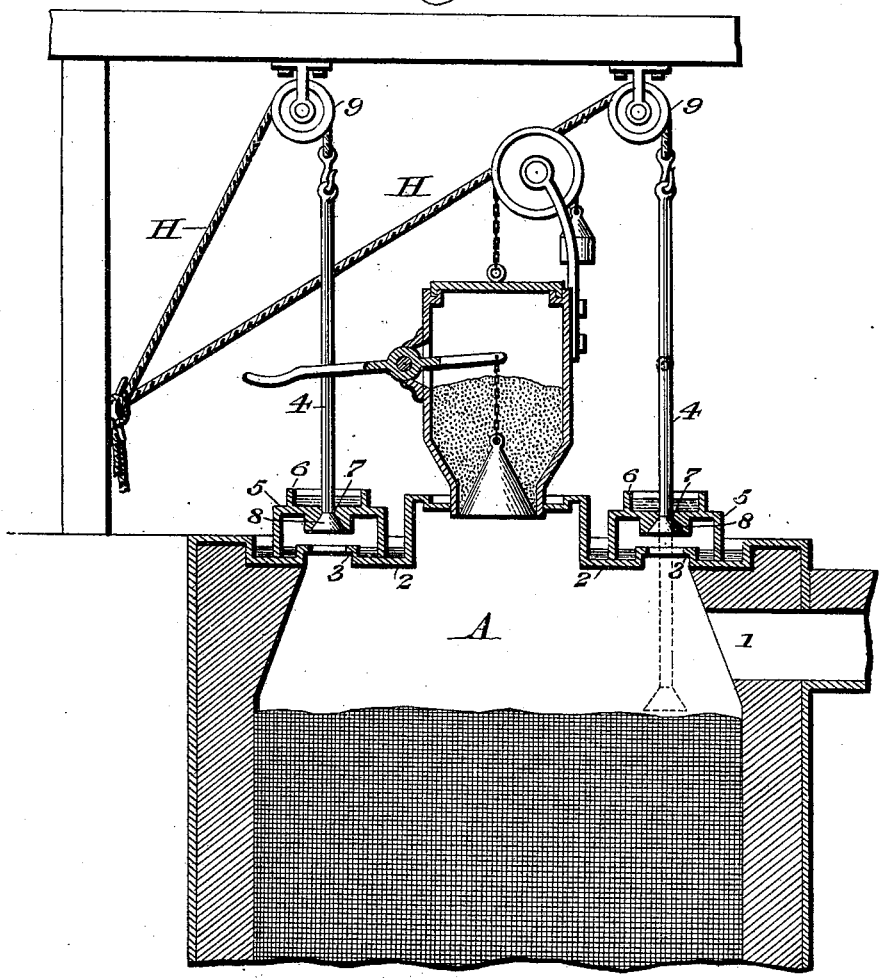
Figure 2:
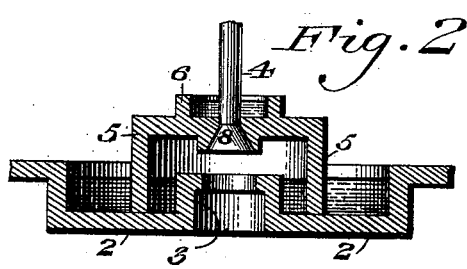

Figure 1 represents a vertical section of a gas-producer embodying my invention. Fig. 2 represents a vertical section of the means for forming the seal, taken on an enlarged scale.

Similar letters and numerals of reference indicate corresponding parts in the figures.

Referring to the drawings, A designates the fire-chamber of a gas-producer, the same having the exit-flue 1. In the top 2 of said chamber are the openings formed in the top wall of a collar 3, which latter rises from said wall, said openings being adapted for the passage therethrough of the bars 4, whereby the fire may be poked. Supported on the top of the chamber above said openings of said collars 3 are the collars 5, on which are supported the cups 6, in the bases of which are openings or sockets 7, which form seats for the conical ends or heads 8 of the bars 4. In order to raise said bars, they are adapted to be connected with the ropes H, which are passed around the pulleys 9, mounted above the fire-chamber, it being noticed that when the bars are lowered the ropes are detached therefrom, and said bars may be manipulated so as to poke the fire, after which the ropes are again connected with said bars and the latter raised, so that the heads 8 close the sockets 7, said ropes or chains, if desired, then being properly secured.

The cups 6 and collars 3 have water placed therein, whereby it becomes somewhat gummy or tarry and incases the bars and conical ends thereof, forming seals which prevent the escape of the gas through sockets 7, a seal also being formed between the two collars for the ends or heads of the bar when in closed position, said collars being preferably concentric, so that the sockets and openings are in alinement.

This application is a division of an application filed January 15, 1898, Serial No. 666,806.

Having thus described my invention, what I claim as new, and desire to secure by Letters Patent, is—

A gas-producer having an opening in its top wall, a bar adapted to work through said opening, said bar having a head on its lower end, a collar rising from said wall around said opening, a collar with an opening therein rising from said wall around the first-named collar, and a cup supported on said last-mentioned collar and having a socket in its base.

JOHN WILLIAM GAYNER.

Witnesses:
JOHN A. WIEDERSHEIM,
HARRY COBB KENNEDY.